April 13, 1937. J. C. PERRIN Re. 20,333

PAPER TOWEL DISPENSER

Original Filed Feb. 2, 1932

INVENTOR:
JAY C. PERRIN,
By Fred W. Lamie
ATTORNEY

Reissued Apr. 13, 1937 Re. 20,333

UNITED STATES PATENT OFFICE 20,333

PAPER TOWEL DISPENSER

Jay C. Perrin, Los Angeles, Calif., assignor to Towlsaver, Inc., a corporation of California Original No. 1,913,722, dated June 13, 1933, Serial No. 590,414, February 2, 1932. Application for reissue June 10, 1935, Serial No. 27,423

10 Claims. (Cl. 242—55.2)

My invention relates to a simple device for dispensing strips of material such as paper towels from a continuous roll of material in uniform lengths.

At the present time crepe paper towels are extensively used in substantially square form, folded so as to fit within a container having an opening in the bottom thereof through which one edge of the lowest folded paper towel will project so as to be in a position for manual engagement whereby to be pulled from the container. It is found that there is a very great waste of such towels owing to the fact that users thereof will not hesitate to pull out several towels, and it is further found that more than one towel will sometimes issue from the container at one time.

It is an object of my invention to provide a dispenser for paper towel material, having means therein for supporting a roll of crepe towel paper, together with means for ejecting measured portions of a strip of paper from a roll, so that such projecting portions may be torn off and used. Associated with the feeding or dispensing means of the device is a simple means for measuring the length of the strips of paper fed from the container, this measuring means being controlled by a lever which must be manually actuated each time it is desired to obtain a sheet of towel paper from the dispenser. The dispensing device is provided with a handle connected to the feeding or delivery means. This handle may be rotated through a definite arc of rotation, such as through one complete rotation, whereupon it is positively stopped by the control means of the device and cannot be again moved until a latch means associated with the control device is retracted manually by moving the projecting control lever.

A further object of the invention is to provide a simple form of control means having parts automatically moved into position for stopping the movement of the feeding mechanism of the towel dispensing device, it being an especial object of the invention to provide a construction adapted to be very cheaply manufactured, though rugged and serviceable.

An important object is to provide a dispenser having a couple of cooperating gripping rollers spaced from the roll of material and adapted to grip the paper therebetween and which rotate for a predetermined number of revolutions in order to accurately measure and dispense strips of paper of greater length than width at each operation, and manually operable means having means associated therewith for preventing an over stroke of the operating and dispensing means and necessitating manual release before a subsequent operation is possible.

While I have set forth herein as an object of my invention, the dispensing of paper towels, it will be apparent that the mechanism shown is readily adapted for use in connection with other kinds of flexible sheet material.

Further objects and advantages of the invention will be made evident throughout the following part of the specification.

Referring to the drawing, which is for illustrative purposes only,

Figure 1:
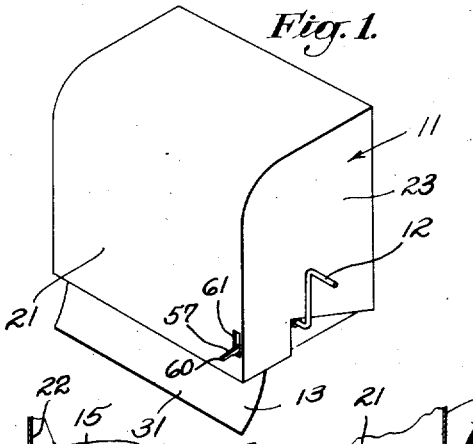
Fig. 1 is a perspective elevational view showing a preferred form of my invention.
Figure 2:
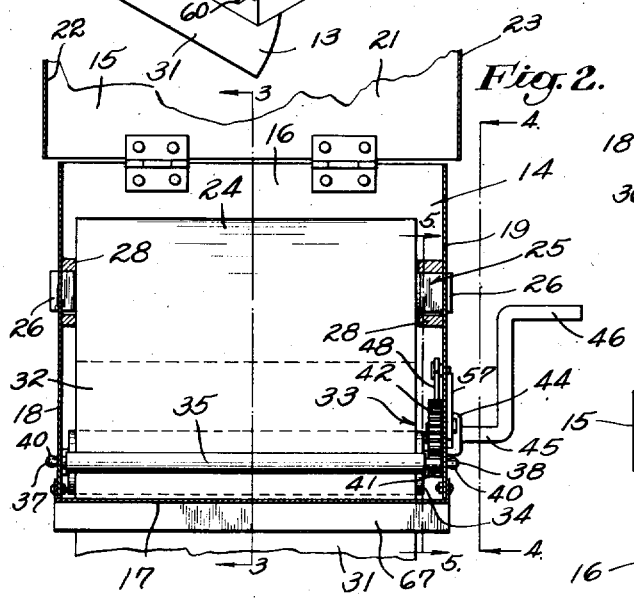
Fig. 2 is an enlarged front view of the device with the cover thereof in raised position.
Figure 3:
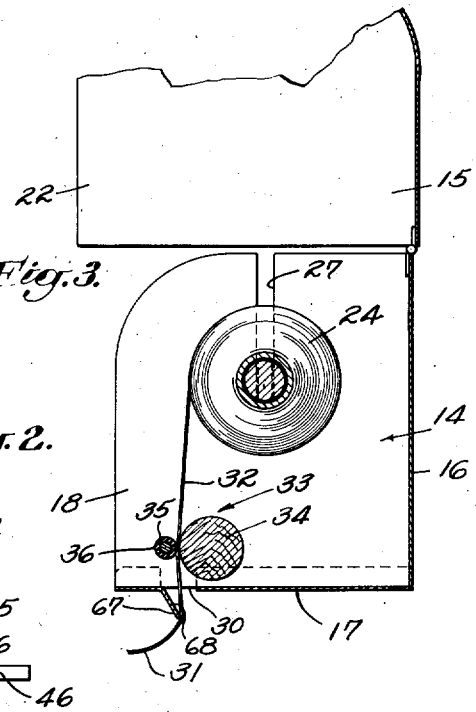
Fig. 3 is a cross section on a plane represented by the line 3—3 of Fig. 2.

As shown in Fig. 1, the invention employs a case or container 11 adapted to be secured to a wall and having a handle 12 at one end thereof which may be rotated to cause a portion 13 of towel paper to issue from the case 11 in a position where it may be readily gripped and torn off. As shown in Figs. 2 and 3, the container 11 includes a base or body portion 14 and a cover 15. The base 14 has a back 16, a horizontally extending bottom 17, and side walls 18 and 19 which extend vertically from the ends of the bottom 17 and forwardly from the ends of the back 16. The cover 15 includes a front wall 21 of sheet metal which is bent rearwardly at its upper end so as to provide a top for the case 11, and side walls 22 and 23 which are adapted to cover the side walls 18 and 19 when the cover 15 is in closed position as shown in Fig. 1.

Means is provided for holding a roll of paper 24 within the case 11, such means preferably consisting of a bar 25 having flattened ends 26 adapted to slide downwardly in vertical notches 27 in the side walls 18 and 19. To hold the roll 24 centralized within the case, spacer rings 28 may be employed on the ends of the bar 25, as shown in Fig. 2. In the bottom 17, preferably but not necessarily, an opening 30 is formed through which the end 31 of the strip of paper 32 comprising the roll 24 may be fed by means of feeding or delivery means 33 consisting of a primary dispensing roller 34 and an auxiliary roller 35 associated therewith. One of the rollers 34 or 35 may have, though not necessarily, a frictional band 36 of rubber, which is indicated in Fig. 3. The dispensing rollers 34 and 35 have projecting trunnions 37 and 38, which extend through openings in the lower parts of the side walls 18 and 19, and tension springs 40 connect the ends of the trunnions 37 and 38 for yieldably holding one of said rollers relative to the other roller. Rollers 34 and 35 are substantially spaced from the roll of paper 24 and grip the paper 32 fed from the roll 24.

Figure 5:
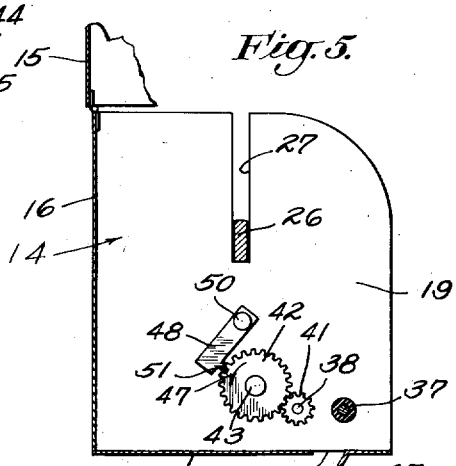
Fig. 5 is a section on a plane represented by the line 5—5 of Fig. 2.

Connected with the roller 34 is a gear 41 which is preferably secured to the rightward end of the roller 34, as shown in Figs. 2 and 5, this gear 41 being engaged by a larger gear 42 mounted on a shaft 43 which projects inwardly from the side wall 19 and is connected with a rotary disc 44 lying adjacent the outer face of the side wall 19. The shaft 43 is continued outwardly, as shown at 45 in Fig. 2, and the end thereof is bent to form a crank or operating handle 46 whereby the gear 42 may be rotated and thereby transmit rotation to the gear 41 and produce rotation of the roller 34. Forward rotation of the gear 42 is indicated by the arrow 47 of Fig. 5, and for preventing reverse rotation a catch 48 is mounted on a pivot 50 which extends inwardly from the side wall 19, such catch having a tooth 51 adapted to engage the teeth of the gear 42.

Figure 4:
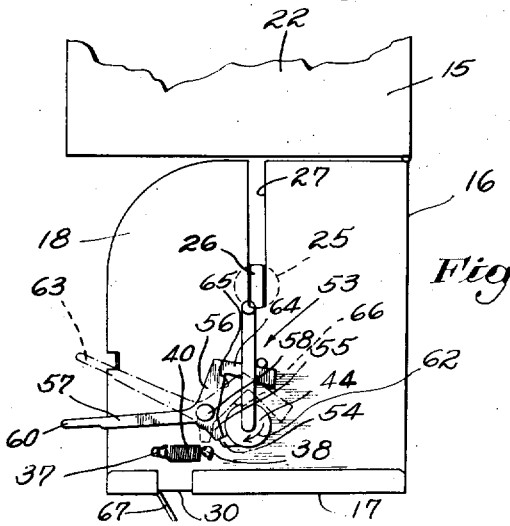
Fig. 4 is a section on a plane represented by the line 4—4 of Fig. 2.

It is preferable that the gears 41 and 42 be so proportioned relative to the diameter of the roller 34 that a single rotation of the handle 46 will produce delivery of a strip 13 of substantially greater length than width, so as to form a towel with a moisture-absorbing capacity sufficient for drying the hands and yet narrow enough to avoid waste. A feature of my invention is to provide in conjunction with the feeding mechanism 33 a means 53 which will accurately measure the length of the strip 32 issued from the machine by stopping the shaft 43, and consequently the parts of the feeding mechanism 33 associated therewith, at the end of a single revolution, thereby preventing a user from continuously feeding the strip 32 from the case 11. The control means 53, as shown in Figs. 2 and 4, includes a lug 54 extended from the periphery of disc 44 fixed to the shaft 43, and a dog 55 which forms a stop for lug 54 at the bifurcated inner end 56 of a lever 57. Said lever is mounted on a pivot member 58 in such position that the forward end 60 thereof will project through a vertically elongated opening 61 in the front 21 of the cover 15, as shown in Fig. 1, so that the forward end 60 of the lever 57 may be manually lifted when it is desired to operate the feeding mechanism 33 of the dispensing device. When the lever 57 is in the position in which it is shown in Fig. 4, the downwardly projecting stop dog 55 extends into the circular path of movement of and is engaged by the lug 54 on rotary disc 44, as shown in Fig. 4, thereby preventing further rotation of shaft 43 and its connected parts in the direction of the arrow 62. When it is desired to obtain a paper towel from the dispensing device, the forward end 60 of the lever 57 is raised to the position indicated by dotted lines 63, with the result that the stop dog 55 is moved out of the path of movement of the rotating lug 54, permitting the lug to move upwardly. Extending upwardly and rightwardly at the inner end of the lever 57 is an arm 64 having an inner face or edge 65 which swings into the position indicated by dotted lines 66 when the lever 57 is raised, thus bringing the inner edge 65 into the path of movement of the rotary lug 54 when the dog 55 is moved leftwardly from engagement with the stop member 54. Consequently, as the lug 54 moves upwardly from the position in which it is shown in Fig. 4 after release of the dog 55, it will engage the inner edge 65 lying in the position indicated by the dotted lines 66 and will force the arm 64 upwardly into its normal position indicated in full lines in Fig. 4, likewise returning the dog 55 to a position within the path of movement of the lug 54, with the result that the lug 54 will be engaged and stopped by the dog 55 at the end of a single rotation of the crank 48.

To facilitate tearing off the projecting end of the strip of paper, I provide a downwardly projecting edge 67, simply formed by bending downwardly the portion of metal 68 removed from the bottom 17 to form the opening 30. The severing of the paper strip is accomplished by drawing it against the lower edge 67 of the member 68 and exerting a diagonal pull.

The controlling means 53 must be manually actuated to remove the dog 55 from the path of movement of the lug 54 each time a sheet of towel paper is desired. I find that it is desirable to issue from the towel dispenser a sheet which is somewhat longer than it is wide, which can be readily accomplished by properly proportioning the roller 34. I have found that under ordinary circumstances the user of paper towels will not go to the additional trouble of lifting the lever 57 after a single towel has issued from the machine, and that as a result of this tendency to avoid effort wherever possible, the number of towels used in a lavatory may be considerably reduced by the installation of a device of the character shown in this application. To obtain towels from the ordinary type of cabinet requires but little labor; therefore, the user will often pull out more towels than he requires, but where a device of the character of my invention is employed, the user will not go to the extra labor of procuring towels from the dispenser which he does not absolutely need.

Although I have herein shown and described my invention in simple and practical form, it is recognized that certain parts or elements thereof are representative of other parts, elements, or mechanism which may be employed in substantially the same manner to accomplish substantially the same results; therefore, it is to be understood that the invention is not to be limited to the details disclosed herein but is to be accorded the full scope of the following claims.

What I claim, is:

1. A dispenser of the character described, including: a supporting structure adapted to hold a strip; roller means for feeding said strip from said support; means for manually rotating said roller means to feed said strip; means for severing the part of said strip issued by said roller means; and manually releasable control means for stopping said roller means after a predetermined rotation thereof, said releasable control means comprising a rotary member connected to said rotating means, a manually operable lever pivotally mounted on said supporting structure, means operable by said rotary member, and movable simultaneously with said lever for engagement with said rotary member, whereby to stop the rotation of said roller feeding means at a given point in different operations.

2. A dispenser of the character described, including: a supporting structure; a roll holder for holding in said supporting structure a strip in roll form; roller means engaging said strip at a point remote from the roll for feeding said strip from said support; a rotatable crank means for manually rotating said roller means to feed said strip; means for severing the part of said strip issued by said roller means; and manually releasable control means for stopping said roller means after a predetermined rotation thereof, said releasable control means comprising a rotary member connected to said rotating means, a manually operable lever pivotally mounted on said supporting structure, a stop member associated with said lever and adapted to be moved by said lever between positions of engagement and non-engagement relative to said rotary stop member, and means associated with said lever for automatically moving said stop member into said position of engagement relative to said rotary member.

3. A dispenser of the character described, including: a case having a back adapted to be secured to a wall and a longitudinal opening through which a strip of paper may issue, there being a longitudinal cutting edge engaged by and for severing the projecting portion of said strip, and side walls projecting upwardly from the ends of said case, a handle having a shaft supported in one of said side walls; a roller connected to the inner end of said shaft whereby to be rotated by said shaft; an idler roller disposed in rolling engagement with said first named roller; means for supporting a roll of paper in said container in such position that the end thereof may be fed between said rollers; a stop member on said shaft, and a lever pivotally mounted adjacent said last named side wall, the free end of said lever projecting into a position to be manually moved, and the inner end of said lever having means thereon adapted to swing in and out of the path of movement of said stop member on said shaft, and an arm adapted to project into the path of movement of said stop member when said means is out of said path of movement and being engageable by said stop member whereby to swing said lever so as to move the means on said lever into said path of movement of said stop member.

4. A dispenser of the character described, including: a case adapted to be secured to a wall and having an opening in a portion thereof through which a strip of paper may issue, a cutting edge adjacent said opening for use in detaching a projecting portion of said strip, a rotary member having an outwardly projecting handle and having a shaft projecting inwardly through an opening in a side of said case, a primary dispensing roller operatively connected with said shaft, an auxiliary idler roller disposed adjacent said primary roller means for supporting a roll of paper in said case in such position for feeding paper therefrom between said rollers, and a lever pivotally mounted on said case in a position to be manually moved, said lever having angularly disposed portions adapted to swing inwardly and outwardly relative to said rotary member, and a lug on said rotary member rotatable in the path of said angularly disposed portions, one of said portions being engageable with said lug so as to move the other portion into position to be engaged by said lug, for stopping the rotation of said rollers at a corresponding point in each dispensing operation.

5. A dispenser of the character described, including: a case adapted to be secured to a support and having an opening through which a strip of paper may issue, means adjacent said opening for detaching a projecting portion of said strip, a rotary control member having a handle and a shaft at a side of said case, dispensing means including a primary roller operatively connected with said shaft and an auxiliary roller, means for supporting a roll of paper in said case in position for feeding paper from said roll between said rollers; said control member having a projection, an operating lever pivoted on said case having its inner end bifurcated and formed with angularly disposed portions for engagement at different positions with the projection on said control member and adapted to move in and out of the path of movement of said projection, one of said portions being engageable with said projection for moving said other portion into engagement with said projection upon the further rotation of said rotary member, so as to stop the rotation of said rollers.

6. A towel dispenser comprising a case, means for rotatably supporting a roll of towel material therein on a fixed axis, a pair of dispensing rollers rotatable in said case and spaced from said roll of material between which the paper from said roll is adapted to be fed outwardly from said case, an operating member geared to one of said dispensing rollers whereby a single revolution of said operating member will effect the rotation of said dispensing rollers to the extent of a plurality of revolutions, for uniformly measuring the strips dispensed in successive operations, and a manually releasable control for stopping said dispensing rollers after predetermined rotation thereof and including a stop member movable manually and independently of said operating member into position to release said rollers, and means operated by rotation of said operating member to restore said stop member to stopping position.

7. A towel dispenser comprising a case, means for rotatably supporting a roll of towel material therein on a fixed axis, a pair of dispensing rollers rotatable in said case and spaced from said roll of material between which the paper from said roll is adapted to be fed outwardly from said case, an operating member geared to one of said dispensing rollers whereby a single revolution of said operating member will effect the rotation of said dispensing rollers to the extent of a plurality of revolutions, for uniformly measuring the strips dispensed in successive operations, and manually releasable means associated with said operating member for limiting the rotation of said operating member to a single revolution at each operation thereof, said means including a stop lever movable manually and independently of said operating member into position to release said rollers, means operated by rotation of said operating member for restoring said lever to stopping position and subsequently engaging said lever to stop said rollers.

8. A towel dispenser comprising a case, means for rotatably supporting a roll of towel material therein on a fixed axis, a pair of dispensing rollers rotatable in said case and spaced from said roll of material between which the paper from said roll is adapted to be fed outwardly from said case, an operating member geared to one of said dispensing rollers whereby a single revolution of said operating member will effect the rotation of said dispensing rollers to the extent of a plurality of revolutions, for uniformly measuring the strips dispensed in successive operations, and manually releasable means associated with said operating member for limiting the rotation of said operating member to a single revolution at each operation thereof, said means including a lever, and a stop member rotatable with said operating member and engageable with said lever to prevent an overmovement of the operating member, and means on said lever engageable with said stop member prior to the completion of a revolution of the operating member, for restoring said lever to position to stop the rotation of the operating member.

9. A dispenser of the character described, including a case member having an opening therein through which a strip of paper may pass, means for supporting a roll of paper in said case, roller means substantially spaced from said roll for engaging said strip at a point remote from the roll for feeding said strip of paper through said opening, a rotatable operating handle at one side of said case, means connecting said handle with said roller means whereby the roller means is rotated a plurality of revolutions at each single revolution of said handle, and manually releasable control means, including a member movable manually and independently of said handle into position to release said roller means, controlled by movement of said handle by stopping said roller means after a predetermined rotation thereof.

10. A towel dispenser comprising a case, means for rotatably supporting a roll of towel material therein, rotatable means spaced from said roll of material for gripping and dispensing strips of material from said roll, and means for automatically effecting and controlling the operation of said dispensing means when the latter is manually operated, whereby each strip dispensed may be of uniformly greater length than the width thereof, said last named means including two members projecting through said case and each manually operable to control and permit operation of said dispensing means.

JAY C. PERRIN.